Dec. 26, 1944.  S. ROSENZWEIG  2,365,842
ALL-DIRECTIONAL SHOCK ABSORBER
Filed Oct. 1, 1943

Inventor
S. Rosenzweig.
Attorney

Patented Dec. 26, 1944

2,365,842

UNITED STATES PATENT OFFICE 2,365,842

ALL-DIRECTIONAL SHOCK ABSORBER

Siegfried Rosenzweig, New York, N. Y.

Application October 1, 1943, Serial No. 504,624

4 Claims. (Cl. 248—20)

This invention relates to vibration isolators and more particularly to a novel device which functions as an all-directional shock absorber to take up unusual loads imposed on a given installation as the result of forces manifested in a vertical or horizontal direction or in any angular component resulting from a combination of such forces.

Accordingly, a primary object of the invention is to provide a unit of construction including essential features of design which may be embodied in various practical forms for use between a machine and its base or foundation thereby to absorb unusual thrusts whether they originate in the machine or its foundation. Heretofore, it has been the general practice to construct vibration isolators primarily to absorb vibrations manifested in a vertical direction or in a direction perpendicular to the foundation, but with the advent of aerial bombing on land and sea it has become essential not only to provide for normal or calculated absorption but also to meet extraordinary shock and recoil, resulting from forces set in motion in any direction. The present invention adequately provides for these contingencies in all structural forms.

Another object of the invention is to provide practical structures utilizing the principle of the wedge which, through the medium of the inclined plane, converts a force acting in one direction into forces of different or equal magnitude acting in different directions. Thus, the present invention has in view the utilization of the characteristics of a wedge in an all-directional shock absorber which has the advantage of requiring a shock absorbing medium acting in only one direction but which can be made to absorb shock from forces acting in any direction, and, by varying the angular inclination of the wedges and the characteristics of the resilient shock absorbing material, the energy of any shock can be absorbed with any desired travel.

A further and more special object is to provide a construction wherein the shock absorbing device consists of resilient elements disposed to be operative in a horizontal direction and arranged between top and bottom plates in such a way as to be responsive to thrust transmitted by a vertical member on one of the plates from any direction and imparted to either plate.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawing, in which.

Similar reference characters designate corresponding parts throughout the several figures of the drawing.

The invention essentially includes upper and lower plate elements having a horizontally operating shock absorbing device arranged therebetween, and carried by one of the plates, while the other of said plates carries an actuator preferably in the form of a vertical plunger or its equivalent, having cam means cooperating with complemental parts on shoe elements of the shock absorbing device.

Figure 1:
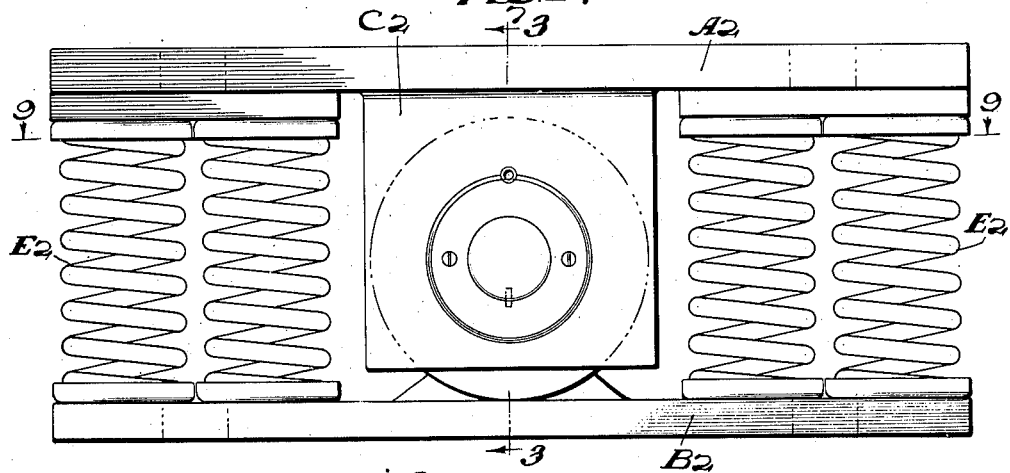
Figure 1 is a side elevation of a third form of the invention.
Figure 2:
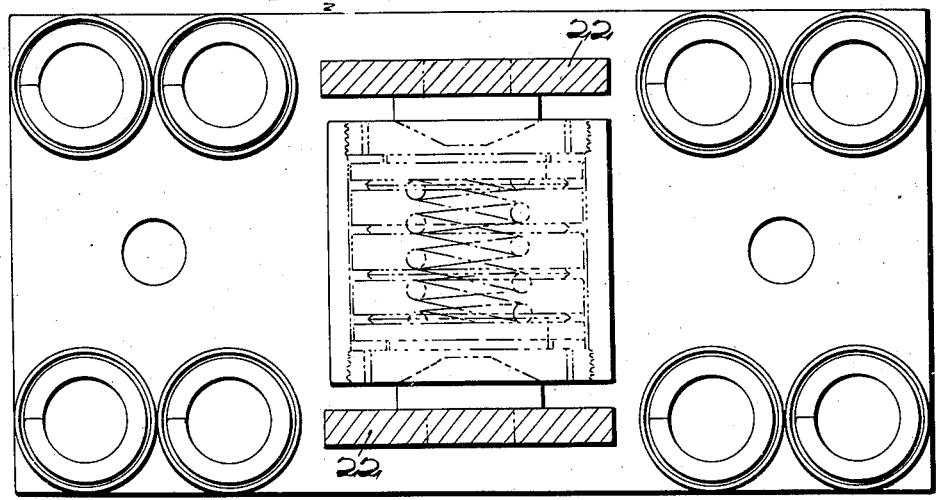
Figure 2 is a horizontal sectional view taken on the line 2—2 of Fig. 1.
Figure 3:
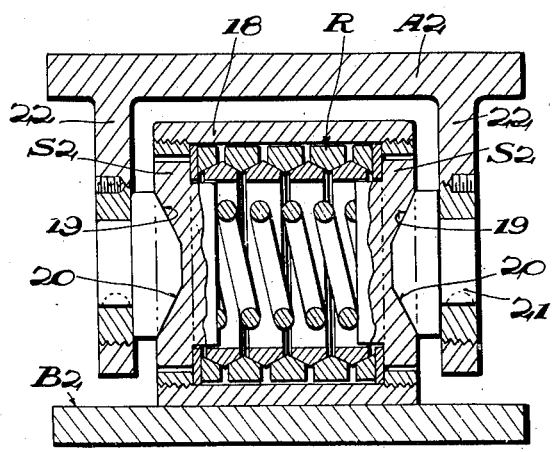
Figure 3 is a vertical sectional view taken on the line 3—3 of Fig. 1.

Figures 1–3 inclusive of the drawing illustrate a construction wherein only a single casing is required to house the resilient means while only two shoes and their related wedge means are required. In this embodiment the upper plate $A^2$ and the lower plate $B^2$ may also be equipped with the isolating springs $E^2$ if desired, while the shock absorber $C^2$ is arranged centrally of the plates and is designed to take up unusual shock or vibration when required.

As will be observed from Fig. 3 the lower plate $B^2$ has a casing 18 secured thereto, the same housing a ring spring type of resilient means R on the order of that disclosed in my former Patent No. 2,281,955, granted May 5, 1942. At opposite ends of the resilient means R suitable shoes $S^2$ in the form of disks are provided. These disks have their inner faces engaging the resilient spring means R while their outer faces are provided with conical sockets 19 to receive the conical heads 20 of the wedges 21 carried by the plunger flanges 22 depending from the underside of the top plate $A^2$. The plungers 22 have their upper ends rigidly connected with the underside of the plate and are spaced apart so as to lie opposite the disks which constitute the shoes $S^2$. In this arrangement it will be apparent that the force of shock tending to move the plates $A^2$ and $B^2$ toward each other will be resisted by the conical heads 20 of the wedges engaging the conical friction sockets 19 of the spring-pressed shoes. Moreover, in the event of horizontal forces being applied either to the top or bottom plate the conical surfaces 20 of the cams or wedges 21 and the friction sockets 19 of the disks will cooperate to arrest or resist such movement. Any relative vertical or horizontal movement of plates $A^2$ and $B^2$ in any direction radial to the axis of the wedges 21 will cause the shoe disks $S^2$ to transmit the force to the resilient means R and thus absorb or arrest otherwise damaging movement of the machine relative to its base.

From the foregoing it will be apparent that in all forms of the invention the top and bottom plates or their equivalent will be adequately supported to absorb both shock and recoil manifesting itself in a vertical or horizontal direction, or any component resulting from a combination of these forces.

I claim:

1. An all-directional shock absorber for machinery bases and the like, comprising, upper and lower plates respectively supporting the machine and resting on the sub-base, a shock absorbing device, including, a single tubular casing, resilient shock absorbing means confined therein, shoes in the form of discs slidably mounted in each end of the casing and adapted to compress said resilient shock absorbing means, said shoes being provided on their outer faces with conical sockets, actuating means for said shoes consisting of a pair of connected plunger plates spaced outwardly of each disc, and cam means in the form of conical wedges carried by said plates and engaging said control sockets.

2. An all-directional shock absorber for machinery bases and the like, comprising, upper and lower plates respectively for supporting the machine and resting on the sub-base, a shock absorbing device including a casing carried by one of the plates, shoes at opposite ends of the casing having friction sockets, resilient means in the casing for urging said shoes outwardly, and plunger means carried by the other of said plates at opposite ends of the casing having friction elements bearing in said sockets.

3. An all-directional shock absorber for machinery bases and the like, comprising upper and lower plates respectively for supporting the machine and resting on the sub-base, a shock absorbing device including a single horizontally disposed casing carried by one of the plates and disposed centrally between both plates, shoes having friction sockets at opposite ends of the casing, resilient means in the casing for urging said shoes outwardly, a pair of spaced plungers carried by the other plate and located adjacent the opposite ends of the casing, and friction wedge elements carried by said plungers and engaging in the friction sockets of said shoes.

4. An all-directional shock absorber for machinery bases and the like comprising, in combination, upper and lower plates respectively for supporting the machine and resting on the sub-base, vibration absorbing elements yieldingly supporting said plates, and a shock absorbing device located centrally between said plates and within the area of the vibration absorbing elements, said shock absorbing device including a pair of axially aligned horizontally disposed shoes having friction sockets in their outer faces and spring-urged in opposite directions and associated with one of the plates, and plunger means having a friction wedge elements engaged with the friction sockets of said shoes and carried by the other of said plates.

SIEGFRIED ROSENZWEIG.